United States Patent [19]

Convers et al.

[11] 4,287,089

[45] Sep. 1, 1981

[54] METHOD FOR REMOVAL OF WATER FROM ACTIVATED CARBON

[75] Inventors: Ronald J. Convers; David P. Higley, both of Ponca City, Okla.; James A. DeBernardi, Sulphur, La.

[73] Assignee: Conoco, Inc., Ponca City, Okla.

[21] Appl. No.: 131,979

[22] Filed: Mar. 20, 1980

[51] Int. Cl.$^3$ .................... B01D 15/06; B01J 37/00; C01B 31/02
[52] U.S. Cl. ................ 252/414; 252/411 R; 423/461; 34/9
[58] Field of Search .............. 423/460, 461; 34/9; 252/411 R, 414

[56] References Cited

U.S. PATENT DOCUMENTS

| 3,274,104 | 9/1966 | Hamilton | 252/411 |
| 3,275,549 | 9/1966 | Crabb et al. | 34/9 |
| 3,396,473 | 8/1968 | Turner | 252/411 |

FOREIGN PATENT DOCUMENTS 470558  8/1937  United Kingdom .

OTHER PUBLICATIONS

CA 31-2366 (1936); 42-3639 (1948).

*Primary Examiner*—O. R. Vertiz
*Assistant Examiner*—Gregory A. Heller
*Attorney, Agent, or Firm*—Bayless E. Rutherford, Jr.

[57] ABSTRACT

A method of removing water from activated carbon is disclosed. Briefly, the method comprises (a) passing liquid 1,2-dichloroethane through a bed of activated carbon until a bulk water phase ceases to exit the bed or until from about 60 to about 80 weight percent of the water present in a water-saturated bed has been removed and (b) passing vapor phase 1,2-dichloroethane through the bed of activated carbon to remove substantially all of the remaining water.

10 Claims, No Drawings

METHOD FOR REMOVAL OF WATER FROM ACTIVATED CARBON

CROSS-REFERENCE TO RELATED APPLICATIONS

The following commonly-assigned applications, and filed the same date as the present application, are directed to solving the same problem as the invention of the present application.

Ser. No. 132,024, wherein the inventor is David P. Higley, is entitled "Improved Method for Removal of Water from Activated Carbon".

Ser. No. 132,006, wherein the inventors are Ronald J. Convers and James A. DeBernardi, is entitled "Improved Method for Removal of Water from Activated Carbon".

FIELD OF THE INVENTION

The invention is in the general field of removing water from activated carbon. Particularly, it is in the field of removing water from activated carbon which has been used in the purification of 1,2-dichloroethane.

GENERAL BACKGROUND

The preparation of polyvinyl chloride from vinyl chloride is well-known. Further, the preparation of vinyl chloride by dehydrochlorination of 1,2-dichloroethane is well-known.

1,2-Dichloroethane can be prepared by the direct chlorination of ethylene in the presence of a catalyst such as ferric chloride. Unfortunately, this process may result in the presence of ferric chloride in the product. The removal of the ferric chloride from the 1,2-dichloroethane is desirable before dehydrochlorination in order that excessive by-product formation, coking and fouling in the cracking reactors might be avoided.

One means of removing ferric chloride from the 1,2-dichloroethane is by passing the stream through a bed of activated carbon. Such a process requires that the activated carbon be regenerated periodically by washing with water. In order for the regenerated activated carbon to be fully effective again it is necessary that substantially all of the water be removed from the activated carbon.

We have discovered an improved means of removing the water from the regenerated active carbon.

BRIEF SUMMARY OF THE INVENTION

Briefly, the present invention is directed to a method of removing water from activated carbon wherein the method comprises: (a) passing liquid 1,2-dichloroethane through a bed of activated carbon until a bulk water phase ceases to exit the bed or until from about 60 to about 80 weight percent of the water present in a water-saturated bed has been removed and (b) passing vapor phase 1,2-dichloroethane through the bed of activated carbon to remove substantially all of the remaining water.

Stated differently, the present invention is directed to a method of drying activated carbon.

DETAILED DESCRIPTION

The activated carbon which is subjected to our process usually contains from about 0.1 to about 70 weight percent water. More usually, the activated carbon contains about 0.5 to about 50 weight percent water.

While our process can be used with any activated carbon containing water, it is particularly suitable for removing water from regenerated activated carbon which has been used to remove ferric chloride from 1,2-dichloroethane.

1,2-Dichloroethane is often referred to as ethylene dichloride, or simply as EDC. The term EDC will be used in much of the following description of our invention.

In the first step of our process, liquid EDC is passed through a bed of activated carbon which contains water until a bulk water phase ceases to exit the bed or until from about 60 to about 80 weight percent of the water present in a water-saturated bed has been removed. The temperature of the liquid EDC suitably is in the range of about 0° C. to the boiling point of EDC under operating conditions. In operations at atmospheric pressure, the preferred temperature is in the range of about 25° to about 70° C.

The amount of EDC used is expressed as weight of EDC per weight of activated carbon. A suitable amount of liquid EDC used in this step is in the range of about 0.2 to about 4 times the amount of activated carbon. Preferably, the amount of liquid EDC used in this step is about 0.2 to 1.5 times the amount of activated carbon.

It might be well to mention that the relative amounts are often expressed as "bed weights". For example 2 bed weights of EDC refers to an amount of EDC which is 2 times the amount of activated carbon on a weight basis.

If desired, the required amount of liquid EDC to be used in this step can be determined by monitoring the exit stream from the bed of activated carbon. At first the exit stream will be a single phase water stream. The exit stream then changes to a two-phase water-EDC stream. The change from a single-phase stream to a two-phase stream indicates the end of the first step. If the activated carbon was initially water-saturated, some 60 to 80 weight percent of the original water will have been removed in this step.

It should be emphasized at this time that while more than 80 bed weights of liquid EDC are required to remove substantially all of the water, only about 0.5 to 1.5 bed weights are required to remove 60 to 80 weight percent of the water from an initially water-saturated carbon bed.

In the second step of our process the activated carbon is treated with vapor phase EDC until substantially all of the water is removed or until a bulk water phase ceases to exit the bed.

The EDC can be at any temperature above about 72° C. at atmospheric pressure. The EDC in this step is preferentially used as superheated vapor. Usually the EDC is at a temperature in the range of about 80° C. to about 150° C.

While anhydrous EDC is very effective in this step of our process it is not necessary that the EDC be anhydrous. This is believed to be an advantage of the process. Suitably, the EDC vapor can contain up to 10,000 parts per million by weight of water. Preferably, the EDC vapor contains less than 2,000 parts per million of water.

EDC and water form an azeotrope which boils at 72°-73° C. and contains 80.5 percent EDC and 19.5 percent water. This feature may contribute to the effectiveness of our process.

Normally, this step of the process is conducted at atmospheric pressure. If necessary, this step can be conducted at reduced or elevated pressure, provided the EDC is in the vapor phase.

A suitable amount of EDC for this step is 1 to 10 times the amount of activated carbon. More preferably, the amount of EDC is 1 to 4 times the amount of activated carbon. While larger amounts can be used it is not economical to do so. To some extent, the temperature of the EDC vapor determines the weight of EDC which must be used to dry the carbon bed.

One means of determining the amount of vapor phase EDC required is the following. When water is being removed the temperature of the activated carbon bed bottom (when downflow is used) is at the azeotrope temperature (72°–73° C. at atmospheric pressure). After substantially all of the water has been removed the temperature of the bed bottom rises to the boiling point of the feed EDC (about 84°–85° C. at atmospheric pressure). Thus, one means of determining when to discontinue blowing with the EDC vapor is by measuring the temperature of the bottom of the activated carbon bed. When the temperature reaches the boiling point of the feed EDC, substantially all of the water has been removed.

Activated carbon which has been treated by the process of our invention suitably will contain less than 50 mg of water per gram of activated carbon, more suitably less than 20 mg of water per gram of activated carbon, and preferably less than 10 mg of water per gram of activated carbon.

In considering these values it is noted that typical commercial activated carbon contains from 10 to 50 mg of water per gram of material.

ADVANTAGES OF OUR PROCESS

An advantage of our process is that less time is required than when the water is removed with 100 percent vapor phase EDC, since the liquid EDC can remove the first part of the water more rapidly.

Another advantage is that less EDC vapor is required when liquid EDC is used for initial water removal, with the result that less heat is required for EDC vaporization.

Other advantages of our process, especially when incorporated in an EDC manufacturing process, are that EDC is readily available and, being condensable and recyclable, does not present a disposal problem.

In order to illustrate the nature of the present invention still more clearly the following examples will be given. It is to be understood, however, that the invention is not to be limited to the specific conditions or details set forth in these examples except insofar as such limitations are specified in the appended claims.

The apparatus used in these experiments can be described briefly as follows. The "drying vessel" was a ca 6"×1" I.D. stainless steel cylinder with a central ⅛" O.D. thermowell. The drying vessel was packed with activated carbon. One inch of fiberglass external insulation was placed on the vessel. The drying agent was brought to the desired temperature by means of an oil bath containing a 10 foot coil of ¼" stainless steel tubing. The drying agent (EDC or nitrogen in the examples) was metered through the immersed coil. From the oil bath the drying agent was passed through the activated carbon bed. Effluent from the drying vessel was passed through a water condenser which had a graduated collector connected to the bottom.

EXAMPLE 1

This example illustrates the invention.

The drying vessel was packed with 35.24 g of Pittsburgh Activated Carbon BPL 12×30 carbon. This carbon bed was saturated with deionized water and briefly blown free of interstitial water with an air stream to leave 25.90 g of added water on the bed. The initial water loading for the subsequent drying experiment was ca 760 mg of water/g of carbon.

In this example, oil bath temperature was maintained at 25° C. while 1.4 bed weights of liquid EDC was pumped into the carbon bed. During this time, 18.6 ml of water separated in the collector. This amounted to 71.8 percent of the original water. The EDC pump was stopped. The bed feed line was disconnected, blown empty of EDC with nitrogen, and reconnected. The oil bath was heated to 203° C. and EDC was metered into the heated coil at ca 1.94 g/min over 3 hours. Total EDC vapor used was 9.9 bed weights. The EDC pump was then stopped and the system was blown free of EDC vapor with nitrogen (3 l/min at 25° C., 1 atm) for 15 minutes. Final bed water content was 3.9 mg of water/g of carbon. Carbon bed temperature data indicated that about 6 bed weights of the EDC vapor were enough to dry the carbon.

EXAMPLE 2

This example is comparative and shows that a large amount of liquid EDC does not remove the water to a satisfactory amount.

A 33.8 g Pittsburgh Activated Carbon BPL 12×30 carbon bed was saturated with deionized water and briefly blown free of interstitial water with a cool air stream to leave 26.9 g of added water on the carbon. Initial loading was ca 820 mg of water/g of carbon.

With the oil bath maintained at 25° C. a total of ca 77 bed weights of liquid EDC was pumped through the wet carbon bed over 6.0 hours. The bed was then briefly blown free of liquid EDC with nitrogen. Final bed water content was ca 93 mg of water/g of carbon, or ca 10 percent of initial water.

EXAMPLE 3

This and Example 4 are comparative and show that hot nitrogen is a much less efficient drying agent for wet activated carbon than EDC as used in the invention. It is expected that air should behave essentially as nitrogen in carbon bed drying, as long as combustion does not occur.

A similar, 35.30 g Pittsburgh Activated Carbon BPL 12×30 carbon bed was saturated with excess deionized water and briefly blown free of interstitial water with a cool air stream to leave 27.2 g of added water on the bed. Initial water loading for this drying experiment was ca 800 mg of water/g of carbon.

The oil bath temperature was maintained at ca 200° C. Water was metered into the heated coil at 2.5 g/min for 62 minutes. The water pump was stopped and nitrogen (3.0 l/min at 25° C., 1 atm) was metered through the heated coil and into the carbon bed. A total of ca 23 bed weights of nitrogen were used. Final bed water content was 5.1 mg of water/g of carbon.

EXAMPLE 4

A similar, 35.3 g Pittsburgh Activated Carbon BPL 12×30 carbon bed was saturated with excess deionized water and briefly blown free of interstitial water with a cool air stream to leave 27.1 g of added water on the carbon. Initial loading for the drying experiment was ca 790 mg of water/g of carbon.

The oil bath temperature was maintained at ca 200° C. Water was metered into the heated coil at 3.3 g/min for 58 minutes. The water pump was stopped and nitrogen (3.0 l/min at 25° C., 1 atm) was metered through the heated coil and into the carbon bed over 2.55 hours. Total nitrogen used was ca 15 bed weights. Final bed water content was ca 130 mg of water/g of carbon.

EXAMPLE 5

This example further illustrates the invention.

Drying efficiency is affected by the temperatures of both the liquid and vapor EDC feeds. EDC feed rates and rate of heat loss from the carbon bed walls also influence carbon bed drying efficiency.

A 35 g Pittsburgh Activated Carbon BPL 12×30 carbon bed (similar to that used in Example 1) is saturated with deionized water and briefly blown free of interstitial water with a cool air stream to leave a ca 800 mg of water per gram of carbon initial loading.

Liquid EDC at 65° C. is fed into the wet carbon bed at ca 0.25 bed weight per minute. In 4 minutes, liquid EDC feed is stopped, and EDC vapor, produced as in Example 1, is fed into the bed at ca 0.12 bed weight per minute. A plot of bed temperatures versus bed weights of EDC vapor used indicates that ca 4 bed weights of the EDC vapor has been sufficient to finish drying the carbon to ca 5 mg of water per gram of carbon.

Thus, having described the invention in detail, it will be understood by those skilled in the art that certain variations and modifications may be made without departing from the spirit and scope of the invention as defined herein and in the appended claims.

We claim:

1. A method of removing water from activated carbon wherein the method comprises:
   (a) passing about 0.2 to about 4 bed weights of liquid 1,2-dichloroethane through a bed of activated carbon, which contains from about 0.1 to about 70 weight percent water, until a bulk water phase ceases to exit the bed or until from about 60 to about 80 weight percent of the water present in a water-saturated bed has been removed, and
   (b) passing vapor phase 1,2-dichloroethane through the bed of activated carbon to remove substantially all of the remaining water.

2. The method of claim 1 wherein in step (a) the temperature of the liquid 1,2-dichloroethane is about 0° C. to the boiling point of 1,2-dichloroethane under operating conditions.

3. The method of claim 2 wherein in step (b) the temperature of the vapor phase 1,2-dichloroethane is above about 72° C. at atmospheric pressure and about 1 to about 10 bed weights of vapor phase 1,2-dichloroethane are used.

4. The method of claim 3 wherein in step (a) the temperature of the liquid 1,2-dichloroethane is about 25 to about 70° C.

5. The method of claim 4 wherein in step (a) the amount of liquid 1,2-dichloroethane is about 0.2 to about 1.5 bed weights.

6. The method of claim 5 wherein the temperature of the vapor phase 1,2-dichloroethane is in the range of about 80 to about 150° C.

7. The method of claim 6 wherein the amount of vapor phase 1,2-dichloroethane is about 1 to about 4 bed weights.

8. The method of claims 3 or 7 wherein the amount of water in the activated carbon after treatment is less than 10 mg of water per gram of activated carbon.

9. The method of claim 1 wherein:
   (a) the temperature of the liquid 1,2-dichloroethane is about 25° C.
   (b) the amount of liquid 1,2-dichloroethane is about 1.4 bed weights.
   (c) the temperature of the vapor phase 1,2-dichloroethane is about 80 to about 150° C., and
   (d) the amount of vapor phase 1,2-dichloroethane is about 6 bed weights.

10. A method of removing water from activated carbon wherein the method comprises:
   (a) passing about 1.4 bed weights of liquid 1,2-dichloroethane, which is at a temperature of 25° C., through a bed of activated carbon whereby from about 60 to about 80 weight percent of the water present has been removed, and
   (b) passing about 6 bed weights of vapor phase 1,2-dichloroethane through the bed of activated carbon to remove substantially all of the remaining water.

* * * * *

UNITED STATES PATENT AND TRADEMARK OFFICE

CERTIFICATE EXTENDING PATENT TERM
UNDER 35 U.S.C. 156

Patent No.    : 4,387,089

Dated         : June 7, 1983

Inventor(s)   : Karl-Fred De Polo

Patent Owner  : Givaudan Corporation

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 USC 156 (b).

I have caused the seal of the Patent and Trademark Office to be affixed this 18th day of September 1989.

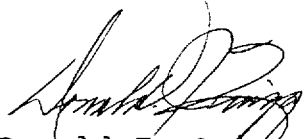

Donald J. Quigg
Assistant Secretary and Commissioner of Patents and Trademarks